United States Patent
Richards (10) Patent No.: US 10,503,961 B2
(45) Date of Patent: Dec. 10, 2019

(54) OBJECT RECOGNITION FOR BOTTOM OF BASKET DETECTION USING NEURAL NETWORK

(71) Applicant: Indaflow LLC, Omaha, NE (US)

(72) Inventor: Jacob D. Richards, Omaha, NE (US)

(73) Assignee: Indaflow LLC, Omaha, NE (US)

( * ) Notice: Subject to any disclaimer, the term of this patent is extended or adjusted under 35 U.S.C. 154(b) by 0 days.

(21) Appl. No.: 15/979,157

(22) Filed: May 14, 2018

(65) Prior Publication Data

US 2018/0260612 A1 Sep. 13, 2018

Related U.S. Application Data

(63) Continuation-in-part of application No. 15/671,618, filed on Aug. 8, 2017.

(Continued)

(51) Int. Cl.

| | |
|---|---|
| *G06K 9/00* | (2006.01) |
| *G06N 5/04* | (2006.01) |
| *G07G 1/01* | (2006.01) |
| *G07G 1/00* | (2006.01) |
| *G06N 3/04* | (2006.01) |
| *G06T 7/90* | (2017.01) |
| *G06K 9/32* | (2006.01) |
| *G06K 9/46* | (2006.01) |
| *G06K 9/62* | (2006.01) |
| *G06N 3/08* | (2006.01) |

(52) U.S. Cl.
CPC ....... *G06K 9/00201* (2013.01); *G06K 9/3241* (2013.01); *G06K 9/4628* (2013.01); *G06K 9/6273* (2013.01); *G06N 3/04* (2013.01); *G06N 3/0454* (2013.01); *G06N 3/08* (2013.01); *G06N 5/046* (2013.01); *G06T 7/90* (2017.01); *G07G 1/0009* (2013.01); *G07G 1/0036* (2013.01); *G07G 1/01* (2013.01); *G06K 2209/17* (2013.01); *G06T 2207/20084* (2013.01)

(58) Field of Classification Search
CPC ............ G06K 9/00201; G06K 9/3241; G06K 9/4628; G06K 9/6273; G06K 2209/17; G06N 3/04; G06N 3/0454; G06N 3/08; G06N 5/046; G06T 7/90; G06T 2207/200084; G07G 1/01
See application file for complete search history.

(56) References Cited

U.S. PATENT DOCUMENTS

| | | |
|---|---|---|
| 5,485,006 A | 1/1996 | Allen et al. |
| 6,741,177 B2 | 5/2004 | Ballantyne |

(Continued)

FOREIGN PATENT DOCUMENTS

| | | |
|---|---|---|
| WO | WO 1998/042239 | 10/1998 |
| WO | WO 2017/146595 | 8/2017 |

*Primary Examiner* — Edward Park
(74) *Attorney, Agent, or Firm* — Y. Kamaal Patterson (57) ABSTRACT

A checkout lane management system is described that uses object recognition to detect whether one or more items is under a shopping cart during a customer checkout process. The checkout lane management system may comprise one or more of cameras for collecting a stream of images focused on a checkout lane. The checkout lane management system may also comprise one or more of a light device, electronic approval button, and a speaker device as part of a checkout lane device for displaying a BOB indicator or sounding the BOB indicator.

18 Claims, 7 Drawing Sheets

Related U.S. Application Data (60) Provisional application No. 62/372,131, filed on Aug. 8, 2016.

(56) References Cited

U.S. PATENT DOCUMENTS

| | | |
|---|---|---|
| 7,246,745 B2 | 7/2007 | Hudnut et al. |
| 7,868,759 B2 | 1/2011 | Zimmerman |
| 8,219,438 B1 | 7/2012 | Moon et al. |
| 2006/0147087 A1* | 7/2006 | Goncalves ........... G06K 9/3233 |
| | | 382/103 |
| 2007/0084918 A1 | 4/2007 | Tabet et al. |
| 2008/0088444 A1 | 4/2008 | Rosebush |
| 2014/0002646 A1* | 1/2014 | Scheffer ................ H04N 7/18 |
| | | 348/143 |
| 2016/0217387 A1 | 7/2016 | Okanohara et al. |
| 2016/0300212 A1 | 10/2016 | Cordova et al. |
| 2017/0364757 A1* | 12/2017 | Rajabizadeh ...... G06K 9/00805 |
| 2018/0033066 A1 | 2/2018 | Liu et al. |

\* cited by examiner

OBJECT RECOGNITION FOR BOTTOM OF BASKET DETECTION USING NEURAL NETWORK

BACKGROUND OF THE INVENTION

Checkout lanes at retail store locations like grocery stores present risk of loss for retailers during each customer checkout process at those retail stores. Shopping carts are typically designed to comprise a basket and a lower tray. The lower tray is often used for large items such as laundry detergent, boxed canned beverages, packaged sets of paper towels, and/or bags of pet food. Relatedly, items placed on the lower tray of a shopping cart often have a higher than average price per unit compared to items that are typically placed in the basket of the shopping cart.

Currently, retail store clerks operating a checkout lane are limited in their tools to evaluate shopping carts entering into a checkout lane. Clerks (or cashiers) often have easy visibility into the basket itself; however, clerks have less visibility into whether there are items on the lower tray of the shopping cart. While baskets to shopping carts can have wire framing that permit a person to see through to the lower tray, that view to the lower tray becomes obstructed by objects in the basket from a top-down view. Additionally, clerks are often stationary at the checkout lane's register without an opportunity to move around the checkout lane to establish a more direct line of sight with the lower tray to check for any items on the lower tray.

This limitation on the clerk's ability to move for a more direct line of sight can result from a variety of reasons, including a need to checkout items as quickly as possible due to high volumes of customers and/or a need or pressure to not imply a distrust of the customers checking out through the checkout lane. As a result, retail store locations can, and often do, experience losses from unidentified items passing through checkout lanes on the lower trays of shopping carts, whether due to customers failing to remember items are on the lower trays or customers intentionally avoiding payment obligations for such items.

Existing solutions for detection of objects on the lower tray of a shopping cart suffer from shortcomings that limit their usefulness and actual use in the field. Several solutions suffer from being impractically expensive due to the requirement of purchasing expensive cameras, additional lighting, additional monitors, and mounting equipment for the same, e.g., to enable a cashier to view a live-video stream of the lower tray of shopping carts passing through the cashier's checkout lane. Other solutions require high contrast materials secured to the checkout lane aisle flooring and/or lower tray of the shopping carts to enable the solutions' respective analytical processes to accurately perform image data comparisons and make a determination whether one or more items are located on the lower tray of a shopping cart. Still other solutions are burdened by the sheer diversity of point-of-sale (POS) systems across retail stores, even under the same retailer banner. For example, in some embodiments, other solutions suffer from being required to integrate with the POS system for a retail store location and implementation of the solution requires additional, costly and sometimes unsuccessful customization of the solution, which is problematic across tens, hundreds or thousands of stores. What's more, integrating with a POS system presents significant security concerns that retail stores want to avoid and minimize (i.e., from having a third party connect to the system responsible for processing personal financial information from payments). Relatedly, integrating and interfacing a solution with a retail store's location can present the alternative or additional problem of interfering with the checkout process. For example, some solutions that specifically attempt to identify the product that is on the lower tray of a shopping cart may incorrectly identify that product and a customer may be charged an incorrect amount, which affects customer satisfaction as well as may cause errors in a retail store location's inventory management if the error is left uncorrected. Alternatively, solutions that specifically attempt to identify the product that is on the lower tray of a shopping cart may fail to identify the product (e.g., because of a lack of training data for the product) and the solutions fail to indicate an item is on the lower tray of the shopping cart, thereby defeating the purpose of the solution as a bottom-of-basket detection system. As another example, in some embodiments, solutions suffer from requiring specific training images of individual products and their packaging in order to actually identify such products are located on the lower tray of a shopping cart. Given the volume of products and even the variety of packaging designs, sizes, and possible orientations of products for a single brand, this creates persistent retraining needs that may hamper system operations and outcomes, particularly if such a solution is also integrated with a POS system.

SUMMARY OF THE INVENTION

The present invention enables a checkout lane management system that manages one or more checkout lanes to a retail store. One or more cameras capture a stream of images focused each of the checkout lanes to the retail store. The stream of images is processed and analyzed to determine a bottom-of-basket (BOB) status for each checkout lanes. The BOB status indicates whether a shopping cart at the checkout lane has any items on a lower tray of the shopping cart that need to be scanned and paid for. The BOB status is then translated to a BOB indicator that is communicated to a corresponding checkout lane device at the checkout lane. The BOB indicator alerts the cashier at the checkout lane of the presence of items on the lower tray of the shopping cart.

A lane management system in accordance with the present invention includes at least one camera, a computing device comprising a plurality of computing components, and a checkout lane device, where the checkout lane device may comprise an electronic approval button. The computing device of lane management system comprises a collection component, an application component, an analyzing component, a translation component, and a communication component.

An advantage of the lane management system in accordance with the present invention is no additional lighting, monitors, or high contrast materials and related mounting equipment are needed to install the lane management system at a checkout lane of a retail store. Another advantage of the lane management system in accordance with the present invention is no integration is required between the lane management system and the POS system of the retail store (or stores) where the system operates. This eliminates concerns regarding software customizations to interface the lane management system with the data and processes of the POS system at the retail store location(s). Furthermore, this eliminates concerns of directly interfering with the checkout process and avoiding the potential for incorrectly identifying (and incorrectly charging for) products in the lower trays of shopping carts going through the checkout lane(s).

Yet another advantage of a lane management system in accordance with the present disclosure is the lane management system makes a determination of a BOB status without requiring storage of the training data to the neural network on the computing device classifying images. Additionally, another advantage of a lane management system in accordance with the present disclosure is the lane management system does not require direct comparison of a captured image from the stream of images against a database of images (or even a smaller subset of features from such a database of images). The advantages of not requiring storage of the training data on the computing device classifying an image is a reduction in on-site storage capacity requirements and reduction in memory management needs for the lane management system to operate when a checkout lane is in use. The advantage of not requiring comparisons of captured images from the stream of images against a database of images is a reduction in demands on processing speed and capacity, thereby reducing probabilities of processing errors due to processor overload or lag that would otherwise affect BOB detection analysis.

BRIEF DESCRIPTION OF THE DRAWINGS

For a more complete understanding of the invention and some advantages thereof, reference is now made to the following descriptions taken in connection with the accompanying drawings in which.

DETAILED DESCRIPTION

Figure 1:
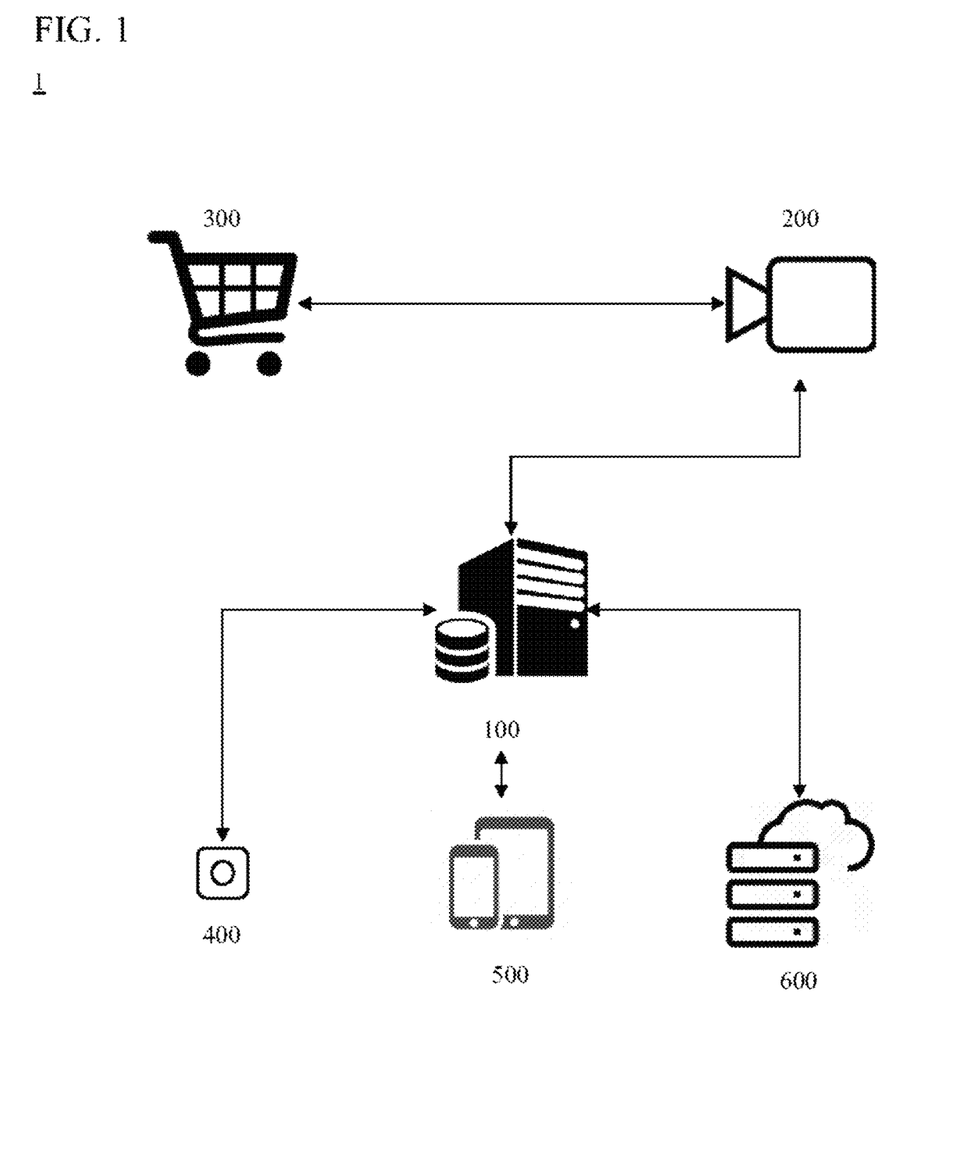
FIG. 1 is a high level view of connected system components.

In accordance with the present disclosure, a lane management system 1 is described that enables identification of whether one or more items 320 are on a lower tray 310 of a shopping cart 300 in a checkout lane 2 of a retail store location. As seen in FIG. 1, a computing device 100 from the system 1 may receive and process images from one or more cameras 200 positioned to capture a stream of images at a checkout lane 2. The computing device 100 from the system 1 may further route communications and information to a checkout lane device 400. The checkout lane device 400 may be attached to a cash register that accounts for a customer's items for purchase and receive payment from the customer purchasing such items to complete the customer's business transaction with the retail store. The computing device 100 may further route communications and information to one or more manager devices 500.

An advantage of the present system 1 comprising the computing device 100, one or more cameras 200, and checkout lane device 400 is the size and portability of the components. Computing device 100 may be a server with a CPU or GPU, RAM, hard drive (e.g., solid-stated device (SSD) hard drive), and appropriate drivers for I/O devices connected to the server, with software including an operating system, a relational database management software suite, VPN software, and other firmware and/or software. Such a computing device 100 can have a compact size. As further described below, checkout lane device 400 may be a simple device comprising one or more light devices 410, electronic approval button 420, and speaker device 430, as well as a digital signal processor (DSP), appropriate drivers for I/O connections, and other firmware and/or software. Also as further described below, camera(s) 200 may be a USB camera configured to connect with the computing device 100 for image processing as described in the present disclosure. The connections between computing device 100 with camera(s) 200 and checkout lane device 400 at a checkout lane 2 may be wired (i.e., with physical wiring, such as CAT6 Ethernet cabling) or connected wirelessly (e.g., via Wi-Fi Internet connection). Similarly, the connections between computing device 100 with checkout lane device 400 may be wired (i.e., with physical wiring, such as USB connection) or connected wirelessly (e.g., via Wi-Fi Internet connection). In embodiments of the present disclosure, the computing device 100 and camera 200 may be packaged together in a single case. In such embodiments, the computing device 100 and camera 200 integrated in a single case may be secured to (or mounted onto) a lower location secured to or as part of a checkout lane conveyor 210 at a checkout lane 2 (e.g., as described below with respect to a camera 200); in such embodiments, the computing device 100 and camera 200 integrated in a single case may be alternatively secured to (or mounted onto) retail shelving of a checkout display at the checkout lane 2.

Figure 2:
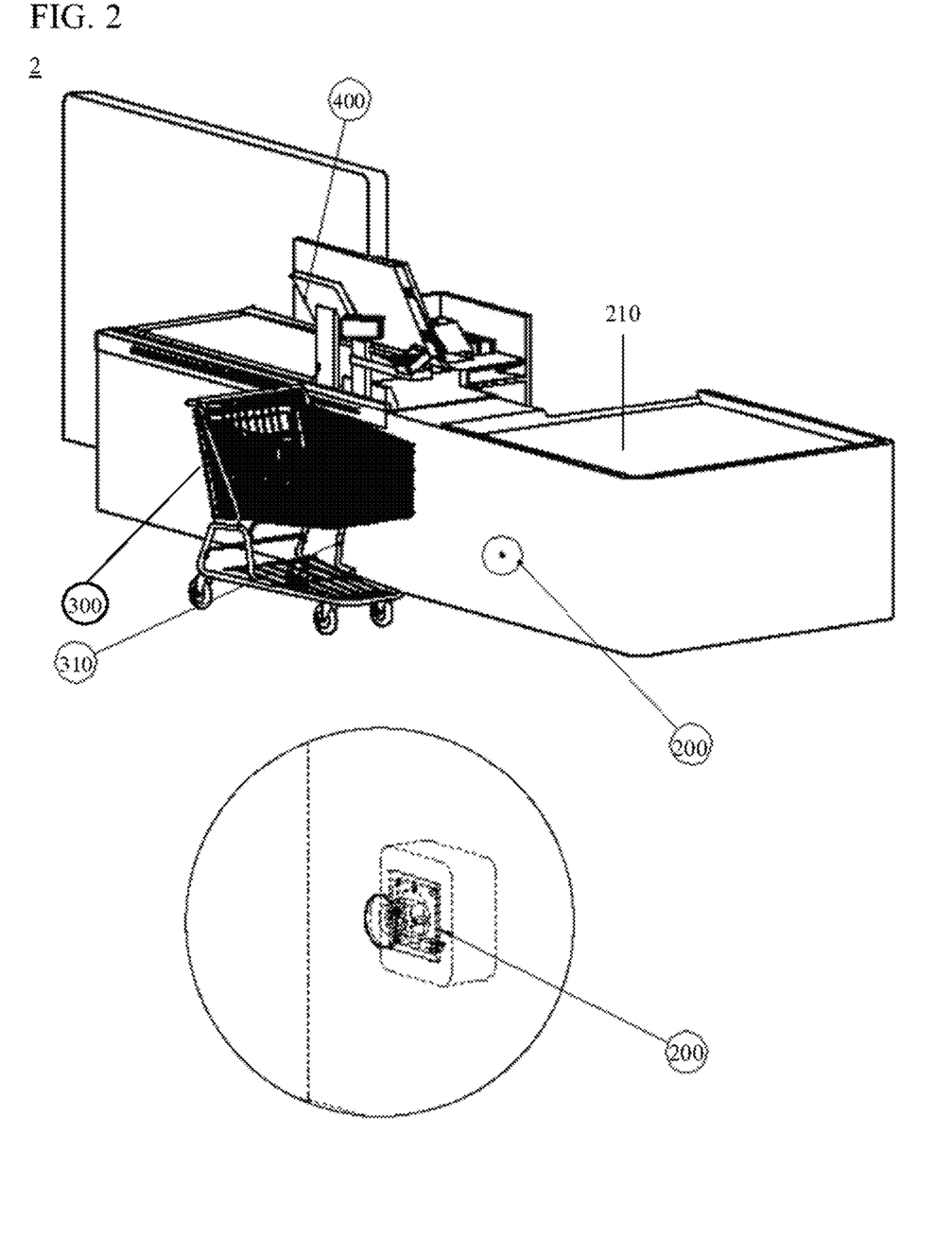
FIG. 2 is an exemplary view of a checkout lane of the present disclosure.
Figure 3:
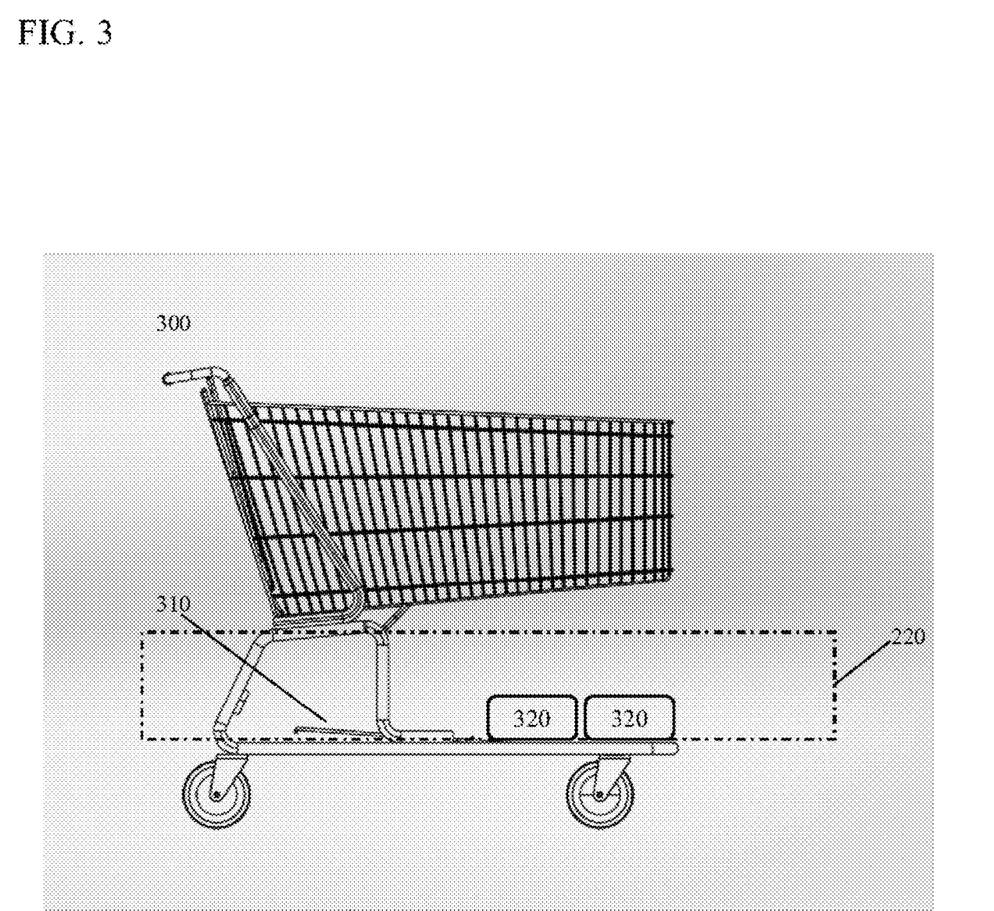
FIG. 3 is an exemplary view of a shopping cart.
Figure 4:
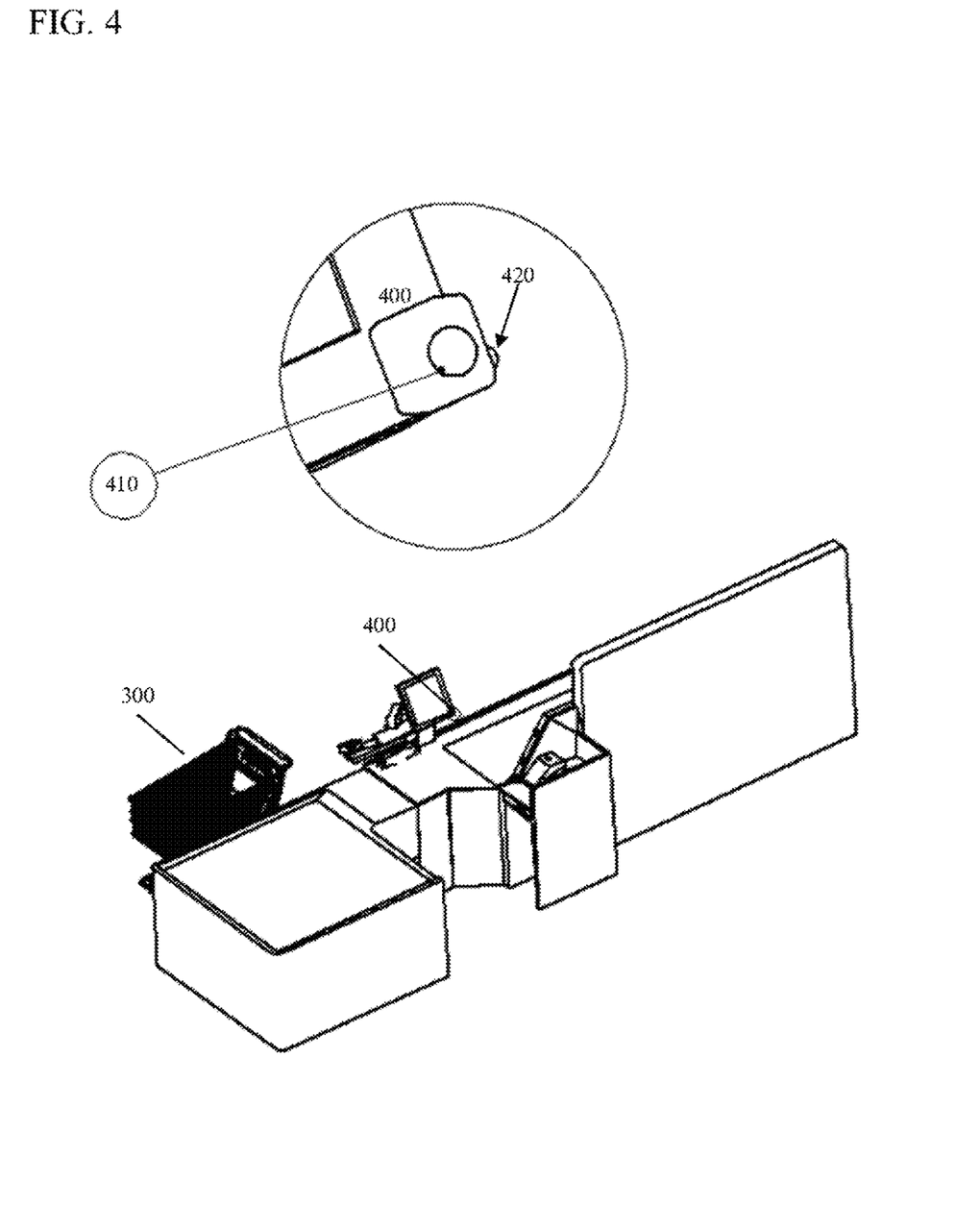
FIG. 4 is an exemplary view of an electronic approval button at a checkout lane.

As seen in FIG. 2, the system 1 includes at least one camera 200 to collect a stream of images from a checkout lane 2. Images captured by a camera 200 at a checkout lane 2 may include images that may have shopping carts 300 exemplified in FIG. 3. The camera 200 may be a variety of camera types capable of capturing a stream of images, such as a digital camera with CCD image sensor, CMOS image sensor, or NMOS image sensor. The one or more cameras 200 at a checkout lane 2 may also include or use lenses (such as normal lens, wide-angle lens, or fish-eye lens) and/or reflective surfaces (such as a planar mirror, conical mirror, or parabolic mirror) selected for collection of the stream of images at the checkout lane 2.

Figure 5:
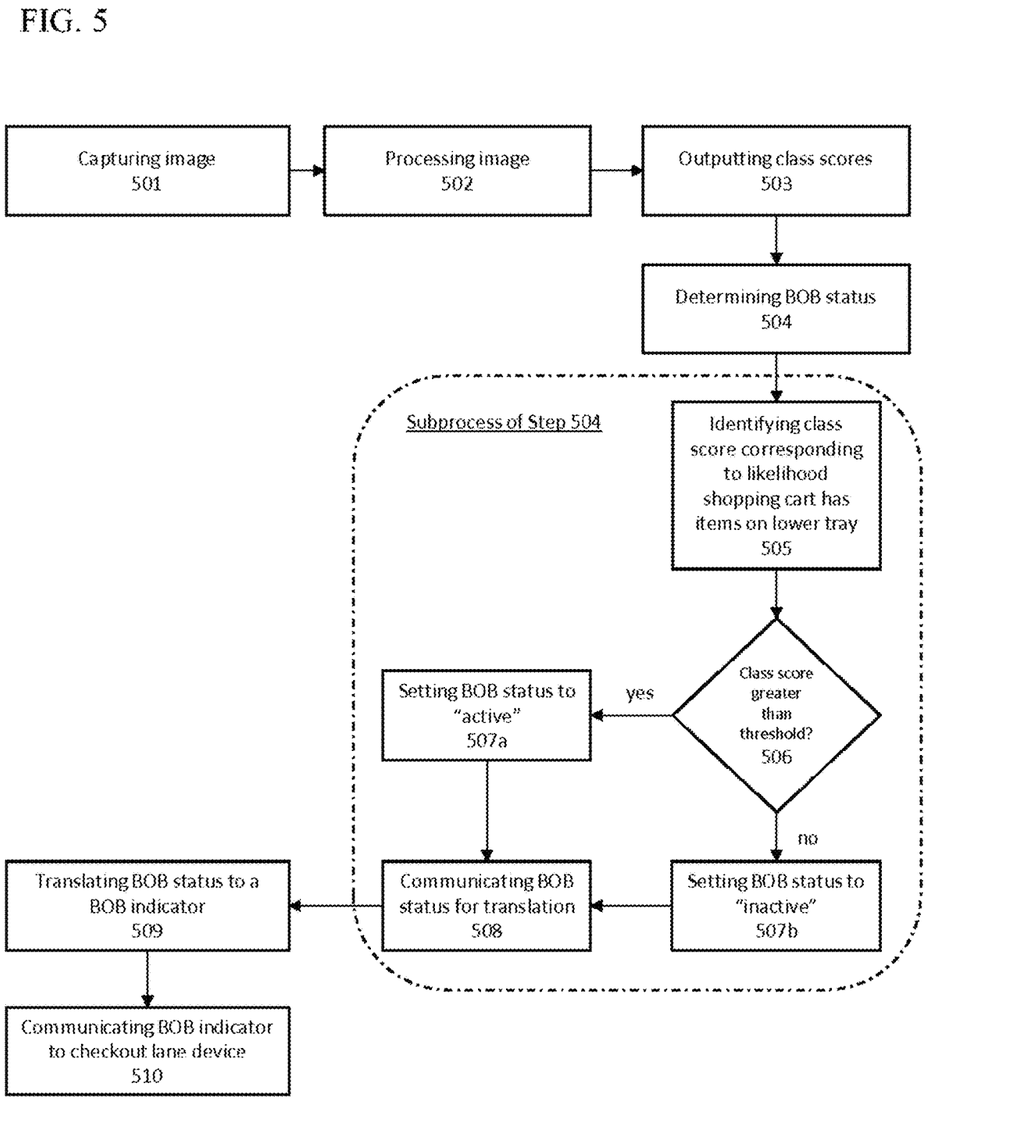
FIG. 5 is an exemplary method of collecting images for a checkout lane.

FIG. 5 provides an exemplary set of steps for collection and processing of the stream of images from the at least one camera 200 at the checkout lane 2. The one or more cameras 200 may be positioned in a number of locations at the checkout lane 2. In embodiments of the present disclosure, a camera 200 may be positioned in a lower location secured to or as part of a checkout lane conveyor 210. In some such embodiments, the camera 200 may be proximal to a customer entry area of the checkout lane 2. In other such embodiments, the camera 200 may be proximal to a customer exit area of the checkout lane 2. In other embodiments of the present disclosure, a first camera may be positioned in a lower location secured to or as part of a checkout lane conveyor 210 proximal to the customer entry area of the checkout lane and a second camera may be positioned in a lower location secured to or as part of the checkout lane conveyor 210 proximal to the customer exit area. For clarity, the customer entry area and the customer exit area are separated by a distance, for example a length of the checkout lane conveyor 210 (in whole or in part). In other embodiments of the present disclosure, the camera 200 may be positioned in retail shelving of a checkout display.

The at least one camera 200 collects a stream of images from the checkout lane 2 (Step 501 of FIG. 5). In embodiments of the present disclosure, the camera 200 passes the stream of images to the computing device 100 for processing. In alternative embodiments of the present disclosure, the camera 200 collects the stream of images and the computing device 100 receives a sampling of the collected images according to a sampling rate (e.g., 10 frames per second). Data for each image from the stream of images comprises both coordinate data and color data. Coordinate data is two-dimensional data corresponding to a plane of pixels captured by the camera. For example, an image may have a width of 100 pixels and a height of 100 pixels. Color data (or depth) represents the color captured at a particular pixel position, and the color data may have three color channels (e.g., red, green and blue, or RGB for short). Therefore, as an example, an image with coordinate data and color data of consisting of a size 100 pixels by 100 pixels by 3 color channels has a total of 30,000 data points.

As part of the image capturing process (Step 501 of FIG. 5), images received from a checkout lane 2 have one or more recognition polygons cast upon the images. The computing device 100 (via software) casts a recognition polygon on an area of each processed image from the stream of images at checkout lane 2. Recognition polygons may be a variety of types that associate with areas of an image. One type of recognition polygon is a tray polygon 220. Recognition polygons are focused on particular parts of the image collected from the camera (or cameras) 200 focused on the checkout lane 2. For purposes of this disclosure, the term "recognition polygon" is used; however, one of ordinary skill in the art would recognize the ability to use a variety of alternative shapes for casting and collecting data from areas of an image (e.g., shapes that are triangular, rectangular, quadrilateral (e.g., trapezoidal), pentagonal, etc.).

The area of an image that may have a recognition polygon cast for image data collection can correspond to a particular part of the checkout lane 2 (or expected area and volume of a shopping cart 300 in the checkout lane 2). The tray polygon 210 may be associated with image data corresponding to an area and height where the stream of images are focused on the lower tray 310 of each shopping cart 300 that enters the checkout lane 2.

Recognition data is collected from the one or more recognition polygons cast on the one or more areas of an image. Recognition data for each pixel encompassed within the one or more areas cast by each recognition polygon may include color data and coordinate data. Recognition data for each pixel may also include (or be associated with) timestamp data collected for the image from which the one or more recognition polygons are cast. Recognition data for each recognition polygon may be stored using a data structure; for example, a data structure that organizes a combination of color data, coordinate data, and timestamp data according to: (i) which recognition polygon the recognition data originated from, (ii) which image the recognition data was captured from, and (iii) which checkout lane 2 the image was collected from.

Processing images from the stream of images comprises applying each such image to a mathematical operation and analyzing results of that mathematical operation to determine a BOB status for a checkout lane 2 (Step 502 in FIG. 5). In some embodiments of the present disclosure using one or more recognition polygons, only image data associated with such recognition polygons is processed. In such embodiments, the color data and coordinate data comprising the recognition data collected from one or one or more recognition polygons (e.g., a tray polygon 210) is processed. Processing a subset of an image using the one or more recognition polygons can simplify calculations (and/or computational burdens), thereby increasing processing speed and efficiency. For example, rather than processing color data and coordinate data from a 200 pixel by 200 pixel image with 3-channels of depth (RGB color) that is captured by a camera (a total of 120,000 data points), calculations can be simplified if a recognition polygon cast on the image (via software) has size 40 pixels by 40 pixels, meaning only 4,800 data points would be processed.

The mathematical operation includes using machine learning techniques to evaluate captured images and classify an image with a BOB status. In particular, for the processing of an image in Step 502 of FIG. 5, the present invention applies captured images to neural network analysis to determine class scores as outputs for classifying the images with a BOB status. A neural network provides a model that enables the computer device 100 to classify images with a BOB status. The neural network may comprise a number of layers of "neurons" or "units", where each neuron (or unit) may receive one or more inputs that define an input that is sent through the neuron's (or unit's) activation function to create an output. A layer with a plurality of neurons, thus, creates an output volume that is a three-dimensional array characterized (or defined) by the set of outputs from each neuron within that layer. The process of defining the neurons (or units) and layers of the neural network relies on training data and a learning process to characterize (or define) how the neural network creates a final output volume in an output layer with a set of class scores, where each class score represents a classification (or label) that may apply to the originally input image to the neural network.

Training data may comprise color data and coordinate data for times when a checkout lane 2 is known to have a checkout in progress with a shopping cart 300 in the checkout lane 2. Additional training data may also comprise color data and coordinate data for times when a checkout lane 2 is known to not have a checkout in progress, such as when the checkout lane 2 is not in service or when the checkout lane 2 is known to not have a shopping cart 300 in the lane. Training data provides a baseline for classifying (or labeling) images in the output volume of a neural network; training and the learning process define parameters, weights, biases and the like for the neural network that processes images during system operation.

Training data includes sets of images known to represent examples of the different classes (or labels) that may result from a neural network. For example, a set of images may be associated with a first class (or label) and the images may comprise exemplary images of a checkout lane 2 without a shopping cart 300. As another example, a set of images may be associated with a second class (or label) and the images may comprise exemplary images of a shopping cart 300 in a checkout lane 2 without any items 320 on its lower tray 310. As another example, a set of images may be associated with a third class (or label) and the images may comprise exemplary images of a shopping cart 300 in a checkout lane 2 with one or more items 320 on its lower tray 310. As another example, a set of images may be associated with a fourth class (or label) and the images may comprise exemplary images of a shopping cart 300 in a checkout lane 2 but an object (such as a shopper's leg) is obstructing the view of the camera 200 to the lower tray 310 of the shopping cart 300. As yet another example, a set of images may be associated with a fifth class (or label) and the images may comprise exemplary images of a checkout lane 2 with an object other than a shopping cart 300 in the checkout lane 2 (such as a shopper's motorized wheelchair, a shopper's stroller for his/her children, and the like).

Training data used to define a neural network may be updated or changed over time through retraining of the neural network. Additionally or alternatively, the training data set used for one neural network for a first checkout lane 2 may be different from the training data set used for a second neural network for a second checkout lane 2 (whether the first checkout lane and second checkout lane are in the same store location or in separate store locations). The ability to differentiate and produce variable neural networks depending on the underlying training data presents customization opportunities to increase performance accuracy and satisfaction, whereas other BOB detection systems in the prior art may suffer from overemphasis on item detection and classification without accounting for operational practicalities presented by variable operating environments (e.g., differences in lighting, flooring, checkout lane conveyor colors, checkout lane product shelving colors and products, and the like from one checkout lane to the next and/or from one store to the next).

Image data captured and processed by the system 1 using the computing device 100 of the present disclosure at an individual checkout lane 2 may become training data for retraining of an operating neural network at a checkout lane 2. Training data may be stored on a remote system 600 (e.g., on a database of the remote system 600) and only the neural network model need be transferred to and operating on the computing device 100 at an individual checkout lane 2. A server of the remote system 600 may provide the computing device 100 at an individual checkout lane 2 in a retail store with the neural network model that will operate on the computing device 100. The most up-to-date neural network model can be transmitted (or communicated) to the computing device 100 from time to time (e.g., at regular periodic intervals such as once per day, once per week, once per month, once per quarter, etc. as set for the remote system 600 and computing device 100). Additionally or alternatively, a human operator of the system 1 may request (or a human operator of the remote system 600 may trigger (or push)) an updated neural network model to the computing device 100. In other embodiments of the system 1, training data may be stored directly on the computing device 100. Some such embodiments may store training data on the computing device 100 for a temporary period of time until the training data is sent to the remote system 600. Other such embodiments may store training data on the computing device 100 for an indefinite period of time.

In embodiments of the system 1, the neural network is a convolutional neural network (CNN) and comprises at least one convolutional layer, at least one pooling layer, and at least one fully-connected layer. An image from the stream of images collected by the camera 200 at a checkout lane 2 is represented by a three-dimensional array of numbers (e.g., an array of size 100 pixels width by 100 pixels height by 3 channels of RGB data (or 100×100×3)). Each image is the input to the CNN.

First, the convolutional layer of the CNN comprises two or more filters (or a plurality of filters). A filter is an array with a width and height smaller than the width and height of the input image (e.g., a 5×5 filter spatial size may be used for an input image with coordinate data size of 100 pixels by 100 pixels). Each filter slides along the width and height of the input image to compute a dot product between the values of the filter and the data at any position of the input image. The result of the dot product for a single filter is a two-dimensional activation map, where "activation" indicates some type of visual feature that makes up the input image (e.g., an edge to an object). The resulting set of activation maps for the two or more filters (or plurality of filters) is a stack of activation maps along the corresponding three-channel depth dimension (RGB) of the input image; the stack of activation maps is the output volume of a convolutional layer. Defining the stack of activation maps, however, may also require further defining the spatial arrangement of "neurons" or "units" that define the output volume. Three hyperparameters control the size of the output volume: depth, stride and zero-padding. For image data, as described above, 3 channels of RGB data define depth. Stride is the number of pixels the filter moves at a time when sliding a filter along the width and height of the input image to compute the dot product. Zero-padding is a control for further manipulating and controlling the spatial size of the output volume (in short, incorporating (or padding) the border of an input volume with zeroes). Accounting for these three hyperparameters defines the needed detail of how many neurons comprise the output volume and how they are arranged. For example, for an input image of 100 pixels by 100 pixels with 3 RGB channels (three-dimensional array sized 100×100×3) and 3 filters of spatial size 1×1 may have a stride of 1 and padding of 0; therefore, the output volume may be a three-dimensional array having a size 90 pixels width by 90 pixels height and depth of 3 channels.

Second, a pooling layer may receive the output volume of a convolutional layer. The pooling layer may help reduce the spatial size of the representation of the input image and may help to control overfitting the CNN. Control of overfitting can be important in the process of avoiding misclassifications of input image data based on underlying training data for a neural network. Pooling may be used to consolidate (or down-sample) the output volume from the prior convolutional layer into a resized array of image data. For example, an output volume of the convolutional layer with size of 90 pixels width by 90 pixels height and depth 3 may be placed through the pooling layer to result in an updated output volume of size 45 pixels width and 45 pixels height with depth of 3 channels.

Third, a fully-connected layer may receive the output volume of a convolutional layer. In other embodiments, a fully-connected layer may receive the output volume of a pooling layer. Similar to a convolutional layer, a fully-connected layer performs a transformation on its input volume that is a function of both the activation map from the input volume and the hyperparameters (i.e., weights and biases in the CNN neurons) that control the size of the input volume (where the input volume of the fully-connected layer is the output volume from the preceding layer of the CNN). A fully-connected layer has full connections to all activations from the preceding layer of the CNN (but neurons within the fully-connected layer are not connected to each other). A fully-connected layer computes a set of class scores of a particular volume size. For purposes of the present disclosure, a fully-connected layer may compute another output volume.

A fully-connected layer may be the final layer of the neural network and outputs a set of class scores (Step 503 of FIG. 5). For purposes of the present disclosure, a fully-connected layer as the final layer of the neural network may compute a set of class scores of size [1×1×2], [1×1×3], [1×1×4], or [1×1×5] (i.e., an array with between 2 and 5 elements). For purposes of the system 1, the CNN may comprise at least one convolutional layer, at least one pooling layer, and at least one fully-connected layer. For purposes of the system 1, the CNN may comprise a plurality of convolutional layers, pooling layers, and/or fully-connected layers in a pattern (e.g., convolutional layer to pooling layer for n-sets of layers, and a final fully-connected layer).

In an embodiment where the set of class scores is sized [1×1×2], the two numbers in the set of class scores corresponds with two categories or labels (e.g., likelihood (or confidence) nothing is present in the checkout lane 2 and a likelihood (or confidence) a shopping cart 300 is present in the checkout lane 2 with one or more items 320 on the lower tray 310). In an embodiment where the set of class scores is sized [1×1×3], the three numbers in the set of class scores correspond with three categories or labels (e.g., likelihood (or confidence) nothing is present in the checkout lane 2, a likelihood a shopping cart 300 is present in the checkout lane 2 without any items 320 on the lower tray 310, and a likelihood (or confidence) a shopping cart 300 is present in the checkout lane 2 with one or more items 320 on the lower tray 310). In an embodiment where the set of class scores is sized [1×1×4], the four numbers in the set of class scores correspond with four categories or labels (e.g., a likelihood (or confidence) nothing is present in the checkout lane 2, a likelihood a shopping cart 300 is present in the checkout lane 2 without any items 320 on the lower tray 310, a likelihood (or confidence) a shopping cart 300 is present in the checkout lane 2 with one or more items 320 on the lower tray 310, and a likelihood (or confidence) an object is obstructing a view of the lower tray 310 of the shopping cart 300). In an embodiment where the set of class scores is sized [1×1×5], the five numbers in the set of class scores correspond with five categories or labels (e.g., a likelihood (or confidence) nothing is present in the checkout lane 2, a likelihood a shopping cart 300 is present in the checkout lane 2 without any items 320 on the lower tray 310, a likelihood (or confidence) a shopping cart 300 is present in the checkout lane 2 with one or more items 320 on the lower tray 310, a likelihood (or confidence) an object is obstructing a view of the lower tray 310 of the shopping cart 300, and a likelihood (or confidence) there is a wheelchair or other mobility aid (like a motorized scooter) in the checkout lane 2). As is apparent from the preceding description, the set of class scores resulting from the neural network correspond to categories (or labels), and the categories (or labels) may be stored to a table of BOB classifications labels. Therefore, each element of the array defining the set of class scores cross-references to a label (or BOB classification value) in the table (e.g., a first element in the set of class scores may cross-reference to a label representative of "nothing present" in the table of BOB classifications).

In each case of the preceding possible embodiments, the value of each number in the set of class scores will total a number representative of one-hundred percent (e.g., 1, 1.00, 100, or 100.00). For example, if the size of the set of class scores is only [1×1×2], the two numbers in the set of class scores could be 0.54 and 0.46. As another example, if the size of the set of class scores is [1×1×3], the three numbers in the set of class scores could be 23, 41, and 36. As yet another example, if the size of the set of class scores is [1×1×4], the four numbers in the set of class scores could be 2, 11, 4, and 83. As yet another example, if the size of the set of class scores is [1×1×5], the four numbers in the set of class scores could be 0.00, 0.08, 0.09, 0.45 and 0.38.

The output volume of class scores from the neural network (e.g., a final layer that is a fully-connected layer) may be analyzed to determine the BOB status for the associated checkout lane 2 (Step 504 of FIG. 5). In embodiments of the present disclosure, analysis of the class scores may comprise comparing the class score associated with a likelihood (of confidence) there is a shopping cart 300 present in the checkout lane 2 with one or more items 320 on the lower tray 310 against the other one or more scores from the set of class scores. In such embodiment, if the class score associated with a likelihood (or confidence) there is a shopping cart 300 present in the checkout lane 2 with one or more items 320 on the lower tray 310 is greater than each of the other individual scores in the set of class scores, then the BOB status may be set to "active". Correspondingly, if the class score associated with a likelihood (or confidence) there is a shopping cart 300 present in the checkout lane 2 with one or more items 320 on the lower tray 310 is equal to or less than each of the other scores in the set of class scores, then the BOB status may be set to "inactive". In other embodiments of the present disclosure, analysis of the class scores may comprise comparing the class score associated with a likelihood (or confidence) there is a shopping cart 300 present in the checkout lane 2 with one or more items 320 on the lower tray 310 against a threshold (e.g., a number representative of 80%). In such embodiment, the class score associated with a likelihood (or confidence) there is a shopping cart 300 present in the checkout lane 2 with one or more items 320 on the lower tray 310 is identified (Step 505 of FIG. 5). If this class score associated with a likelihood (or confidence) there is a shopping cart 300 present in the checkout lane 2 with one or more items 320 on the lower tray 310 equals and/or exceeds the threshold, then the BOB status may be set to "active" (Steps 506 and 507a of FIG. 5). Correspondingly, if the class score associated with a likelihood (or confidence) there is a shopping cart 300 present in the checkout lane 2 with one or more items 320 on the lower tray 310 is less than the threshold, then the BOB status may be set to "inactive" (Steps 506 and 507b of FIG. 5).

In embodiments of the system 1, the BOB status may be set to active for an individual image captured and analyzed by the system 1, which results in a set of class scores with the class score corresponding to a likelihood (or confidence) there is a shopping cart 300 with one or more items 320 on the lower tray 310 that equals and/or exceeds the threshold. In other embodiments of the system 1, the BOB status may be set to active if a minimum active level is met. A minimum active level may require that a plurality of consecutive images captured (or, as applicable, sampled) and analyzed by the computing device 100 results in sets of class scores with the class score corresponding to a likelihood (or confidence) there is a shopping cart 300 with one or more items 320 on the lower tray 310 that equals or exceeds the threshold. In other embodiments, a minimum active level may require that a plurality of images captured (or, as applicable, sampled) and analyzed by the computing device 100 results in sets of class scores indicating one or more items 320 are on the lower tray 310 for a period of time (e.g., 5 seconds).

In such embodiments, the BOB status would be set to active only if the number of images analyzed that result in class scores indicating one or more BOB items is greater than the number of images analyzed for the same period of time that result in class scores failing to indicate any BOB items are present. The BOB status is communicated for translation to a BOB indicator (Step 508 of FIG. 5), where translation is described below in this disclosure.

Once the BOB status is set to active, in embodiments of the system 1, BOB status will reset to inactive upon an individual image captured and analyzed by the system 1 that results in a set of class scores with the class score corresponding to a likelihood (or confidence) there is nothing present in the checkout lane 2 that equals and/or exceeds a threshold (e.g., a number representative of 80%). In other embodiments of the system 1, once the BOB status is set to active, the BOB status will reset to inactive upon the earlier occurrence of a set of class scores with any of the class scores other than the class score corresponding to a likelihood (or confidence) there is one or more BOB items equaling or exceeding a threshold. Similar to a BOB status being set to active, resetting the BOB status to inactive may be subject to a minimum inactive level based on a set number of consecutive images or a set period of time.

If the BOB status of a checkout lane 2 is set to active, the BOB status may be translated to a BOB indicator for the checkout lane 2 (Step 509 of FIG. 5). Translating (or converting) the BOB status to a BOB indicator may comprise signal processing to generate a BOB indicator to be displayed via light device 410 of the checkout lane device 400. In alternative or additional embodiments, translating (or converting) the BOB status to a BOB indicator may comprise signal processing to generate a BOB indicator to be sounded through a speaker device 430 of the checkout lane device 400.

The BOB indicator is then communicated to the checkout lane device 400 of the associated checkout lane 2 by the computing device 100 (Step 510 of FIG. 5). The checkout lane device 400 may be secured to a point of sale system (or register) at the checkout lane 2. The checkout lane device 400 may comprise an electronic approval button 420. The checkout lane device 400 may comprise both a light device 410 and an electronic approval button 420. The light device 410 of the checkout lane device 400 may illuminate or flash when the BOB indicator is communicated to the checkout lane device 400. In embodiments, the light device 410 may be deactivated (and the light turned off) when the electronic approval button 420 is pressed by a cashier at the checkout lane 2. In other embodiments, when the light device 410 is on and illuminated (or flashing), light from the light device 410 may be a different color depending on whether the BOB indicator has been communicated to the checkout lane device 400. For example, light from the light device 410 may be a first color (e.g., green) during the time the checkout lane device 400 has not received the BOB indicator, and the light from the light device 410 may be a second color (e.g., red) when the checkout lane device 400 has received the BOB indicator until such time as the cashier presses the electronic approval button 420. One of ordinary skill in the art would recognize any combination of colors may be used for the light device 410.

In addition or in the alternative to using an electronic approval button 420, in some embodiments of the present invention, the BOB indicator may sound on the speaker device 430 of the checkout lane device 400. In other embodiments, the BOB indicator may be both displayed on the light device 410 of the checkout lane device 400 and sounded on the speaker device 430 of the checkout lane device 400. Displaying the BOB indicator on the light device 410 and sounding the speaker device 430 alerts the cashier of the checkout lane 2 that one or more items 320 are on the lower tray 310 of the shopping cart 300 in the checkout lane 2 at that time. In embodiments of the present invention, pressing the electronic approval button 420 will turn off the light device 410 and/or speaker device 430 from alerting the cashier of the checkout lane 2 that one or more items 320 are on the lower tray 310 of the shopping cart 300.

Figure 6:
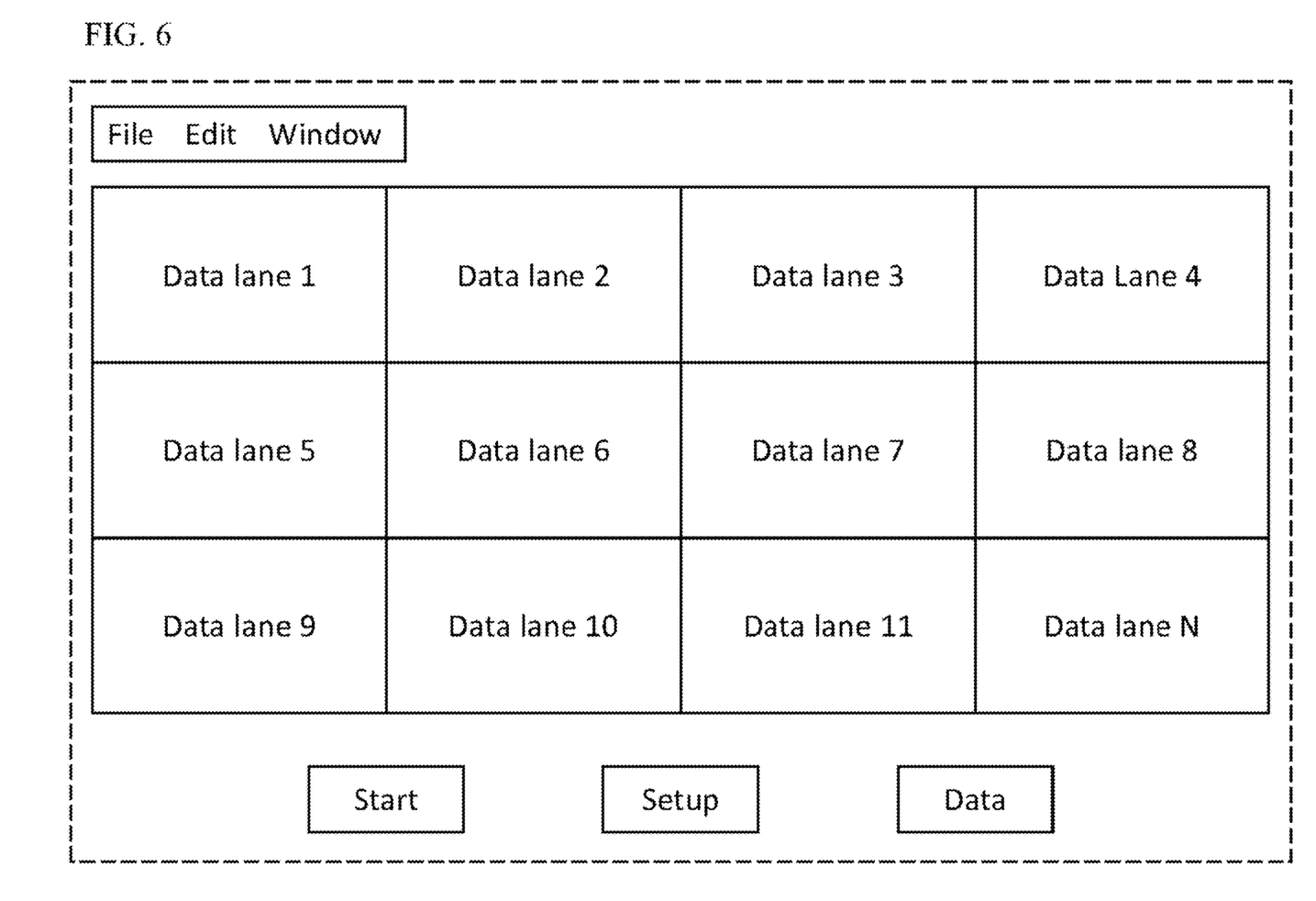
FIG. 6 is an exemplary embodiment of a user interface of a software application displaying a BOB indicator.

In addition to sending the BOB indicator to the checkout lane device 400, the BOB indicator may also be sent to one or more manager devices 500 associated with the retail store location. The manager devices 500 may be a computational device such as a laptop, tablet, smartphone, or other similar device. The manager device 500 comprises a display with a user interface for a manager using the manager device 500 to display information associated with the BOB indicator and the checkout lane management system 1 described in the present disclosure. For example, a manager device 500 may receive the BOB indicator (e.g., through a Wi-Fi or Bluetooth connection with the lane management system 1) and display the BOB indicator for the one or more checkout lane devices 400 at the retail store through a user interface for a software application running on the manager device 500. The BOB status information for the one or more checkout lanes 2 may also be displayed on the manager device 500. An exemplary embodiment of a user interface displaying a screenshot of a software application receiving BOB status data for each checkout lane and other data from the lane management system 1 is seen in FIG. 6.

A manager device 500 or components to the lane management system 1 may also build a checkout report that is made accessible and displayable on the manager device 500. The checkout report may be a composite report for all of the checkout lanes 2 at the retail store location. A composite report may report the number of shopping carts 300 that had items 320 on the lower trays 310 of those shopping carts 300 across all of the checkout lanes 2 at the retail store location for an analyzed period of time (e.g., for a specific day, week, month and/or year). In embodiments of the invention where an electronic approval button 420 comprises the checkout lane device 400, the composite report may report information regarding cashier responses to the BOB indicator. In other embodiments, the checkout report may additionally or alternatively provide individual reports according to each individual checkout lane 2 from the plurality of checkout lanes 2 at the retail store location. Each individual report may report a count of the number of times items 320 were identified on the lower trays 310 of shopping carts 300 passing through that checkout lane 2 for an analyzed period of time (e.g., for a specific day, week, month, and/or year). Once the checkout report is built, the checkout report may be viewed by a manager on a manager device 500, by displaying the checkout report through a user interface (e.g., a display) of the manager device 500.

Figure 7:
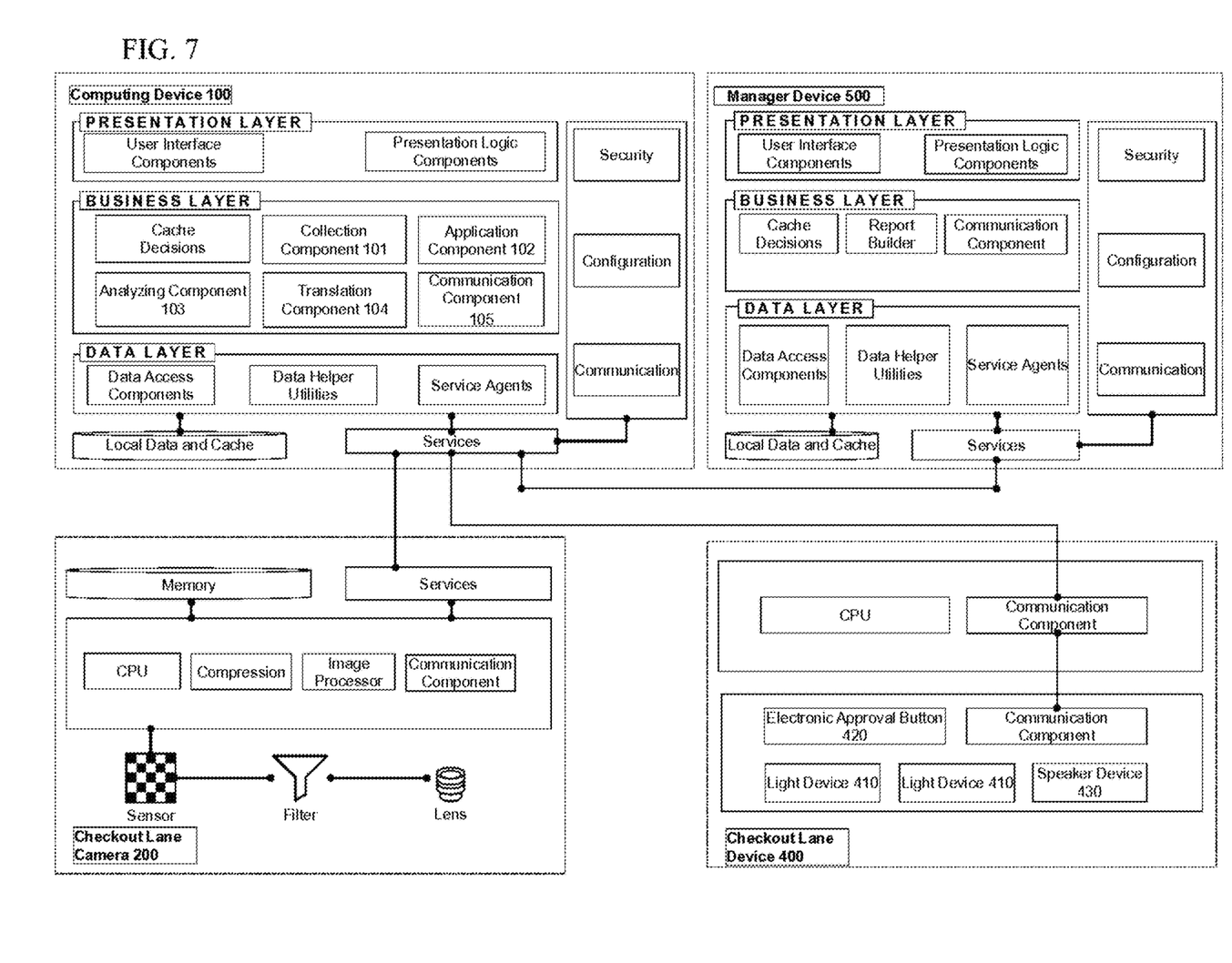
FIG. 7 is a high level architectural view of the computing device.

The lane management system 1 described in the present disclosure may comprise a number of components of hardware, software and a combination thereof. As described above, at least one camera 200 collects the stream of images at each checkout lane 2. A computing device 100 receives the stream of images (or a sampling of the stream of images) from the one or more cameras 200 capturing the stream of images. A high level architectural view of the computing device 100, camera 200, manager device 500, and checkout lane device 400 is seen in FIG. 7. This computing device 100 may include a collection component 101, an application component 102, an analyzing component 103, a translation component 104, and a communication component 105. In additional embodiments, the computing device or one or more manager devices (as described above) may include a report builder, as well. The checkout lane device 400 for each checkout lane 2, may comprise a light device 410, an electronic approval button 420, and speaker device 430. The light device 410 of checkout lane device 400 may comprise one or more light devices (e.g., LED, CFL, incandescent light bulb, etc.) for illuminating according to BOB indicator communicated to the checkout lane device 400.

Within the computing device 100, the collection component 101 collects the stream of images (or sampling of images) received by the computing device 100, as captured by the camera 200. The collection process by the collection component 101 may include casting one or more recognition polygons (via software) on one or more areas of an image captured by the at least one camera 200 at a checkout lane 2. In such instances, the collection component 101 of the computing device 100 collects recognition data associated with the one or more areas encompassed by the one or more recognition polygons (e.g., a tray polygon 220). The application component 102 of the computing device 100 may apply each image (or sampled image) from the stream of captured images to a neural network (e.g., a convolutional neural network (CNN)) for image analysis to generate an output of class scores. In embodiments, the application component 102 of the computing device 100 may only apply recognition data from the one or more recognition polygons cast upon a captured image into the CNN. The analyzing component 103 analyzes the set of class scores output from the CNN to determine a BOB status for the checkout lane. The translation component 104 of the computing device 100 translates the BOB status for a checkout lane 2 to a BOB indicator. The communication component 105 of the computing device 100 communicates the BOB indicator for the checkout lane to a checkout lane device 400 for the checkout lane 2.

While the present invention has been described above in particular detail with respect to a limited number of embodiments, other embodiments are possible as well. The particular naming of the components and their programming or structural aspect is not mandatory or significant, and the mechanisms that implement the invention or its features may have different names, formats, or protocols. Further, the lane management system 1 may be implemented via a combination of hardware and software, as described, or entirely in hardware elements. Also, the particular division of functionality between the various system components described herein is merely exemplary, and not mandatory; functions performed by a single system component may instead be performed by multiple components, as illustrated for example by the description of FIG. 7, and functions performed by multiple components may instead performed by a single component.

The operations described above, although described functionally or logically, may be implemented by computer programs stored on one or more computer readable media and executed by a processor. Computer readable storage media include, for example, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

Throughout the description, discussions using terms such as "processing" or "computing" or "calculating" or "determining" or "displaying" or "analyzing" or the like, refer to the action and processes of a particular computer system, or similar electronic computing device, that manipulates and transforms data representing or modeling physical characteristics, and which is represented as physical (electronic) quantities within the computer system memories or registers or other such information storage, transmission or display devices.

The algorithms and displays presented above are not inherently related to any particular computer or other apparatus. Various general-purpose systems may also be modified by using the teachings herein, or it may prove convenient to construct more specialized apparatus to perform the described method steps. The required structure for a variety of these systems will appear from the description above. In addition, the present invention is not described with reference to any particular programming language, any suitable one of which may be selected by the implementer.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention.

What is claimed:

1. A method of object recognition for a cart in a checkout lane at a retail store location, the method comprising:
    collecting a stream of images from a checkout lane at a sampling rate, where each image includes color data and coordinate data;
    applying each image from the stream of images to a convolutional neural network to determine a set of class scores for each image;
    selecting a class score from the set of class scores for an image where the class score is the highest value in the set of class scores, meets a threshold, or is the highest value in the set of class scores and meets the threshold;
    cross-referencing the selected class score to a BOB classification value from a table of BOB classification labels;
    setting a BOB status for the checkout lane using the BOB classification value;
    translating the BOB status to a BOB indicator; and
    communicating the BOB indicator to a checkout lane device, wherein
    communicating the BOB indicator to a checkout lane device comprises at least one of displaying the BOB indicator on a light device of the checkout lane device and sounding the BOB indicator on a speaker device of the checkout lane device.

2. The method of claim 1, wherein the convolutional neural network comprises a convolutional layer, a pooling layer, and a fully-connected layer.

3. The method of claim 1, wherein setting the BOB status using the BOB classification value comprises setting the BOB status to active, indicating a BOB item is located on a lower tray of the cart, when the BOB classification value represents a likelihood the cart is present in the checkout lane with at least one item on the lower tray of the cart.

4. The method of claim 1, wherein setting the BOB status using the BOB classification value comprises setting the BOB status to inactive, indicating a BOB item is not located on a lower tray of the cart, when the BOB classification value represents a likelihood the cart is not present in the checkout lane.

5. The method of claim 1, wherein setting the BOB status for the checkout lane using the BOB classification value further comprises:
    setting the BOB status to inactive, indicating a BOB item is not located on a lower tray of the cart, when the BOB classification value for the image represents a likelihood the cart is not present in the checkout lane; and
    a plurality of consecutive images collected subsequent to the image result in class scores that cross-reference to the same BOB classification value that represents a likelihood the cart is not present in the checkout lane.

6. The method of claim 1, wherein setting the BOB status for the checkout lane using the BOB classification value further comprises:
   setting the BOB status to active, indicating a BOB item is located on a lower tray of the cart, when the BOB classification value for the image represents a likelihood the cart is present in the checkout lane with at least one item on the lower tray of the cart; and
   a plurality of consecutive images collected subsequent to the image result in class scores that cross-reference to the same BOB classification value that represents a likelihood the cart is present in the checkout lane with at least one item on the lower tray of the cart.

7. An object recognition system for a cart in a checkout lane at a retail store location, the system comprising:
   at least one camera that collects a stream of images from a checkout lane, where each image includes color data and coordinate data;
   a computing device that receives the stream of images from the camera according to a sampling rate, the computing device including
      an application component that applies each image from the stream of images to a convolutional neural network to determine a set of class scores for each image,
      an analyzing component that selects a class score from the set of class scores for an image where the class score is the highest value in the set of class scores, meets a threshold, or is the highest value in the set of class scores and meets the threshold; cross-references the selected class score to a BOB classification value from a table of BOB classification labels; and sets a BOB status for the checkout lane using the BOB classification value,
      a translation component that translates the BOB status to a BOB indicator, and
      a communication component that communicates the BOB indicator to a checkout lane device, wherein communication of the BOB indicator to a checkout lane device comprises production of the BOB indicator as at least one of light from a light device of the checkout lane device and sound from a speaker device of the checkout lane device.

8. The system of claim 7, wherein the convolutional neural network comprises a convolutional layer, a pooling layer, and a fully-connected layer.

9. The system of claim 7, wherein the analyzing component uses the BOB classification value to set the BOB status to active, indicating a BOB item is located on a lower tray of the cart, when the BOB classification value represents a likelihood the cart is present in the checkout lane with at least one item on the lower tray of the cart.

10. The system of claim 7, wherein the analyzing component uses the BOB classification value to set the BOB status to inactive, indicating a BOB item is not located on a lower tray of the cart, when the BOB classification value represents a likelihood the cart is not present in the checkout lane.

11. The system of claim 7, wherein the analyzing component sets the BOB status for the checkout lane using the BOB classification value to inactive, indicating a BOB item is not located on a lower tray of the cart, when:
   the BOB classification value for the image represents a likelihood the cart is no present in the checkout lane; and
   a plurality of consecutive images collected subsequent to the image result in class scores that cross-reference to the same BOB classification value that represents a likelihood the cart is not present in the checkout lane.

12. The system of claim 7, wherein the analyzing component sets the BOB status for the checkout lane using the BOB classification value to active, indicating a BOB item is located on a lower tray of the cart, when:
   the BOB classification value for the image represents a likelihood the cart is present in the checkout lane with at least one item on the lower tray of the cart; and
   a plurality of consecutive images collected subsequent to the image result in class scores that cross-reference to the same BOB classification value that represents a likelihood the cart is present in the checkout lane with at least one item on the lower tray of the cart.

13. A computer program product for object recognition for a cart in a checkout lane at a retail store location, the computer program product stored on a non-transitory computer-readable medium and including instructions adapted to cause a computer to execute steps comprising:
   collecting a stream of images from a checkout lane at a sampling rate, where each image includes color data and coordinate data;
   applying each image from the stream of images to a convolutional neural network to determine a set of class scores for each image;
   selecting a class score from the set of class scores for an image where the class score is the highest value in the set of class scores, meets a threshold, or is the highest value in the set of class scores and meets the threshold;
   cross-referencing the selected class score to a BOB classification value from a table of BOB classification labels;
   setting a BOB status for the checkout lane using the BOB classification value;
   translating the BOB status to a BOB indicator; and
   communicating the BOB indicator to a checkout lane device, wherein communicating the BOB indicator to a checkout lane device comprises at least one of displaying the BOB indicator on a light device of the checkout lane device and sounding the BOB indicator on a speaker device of the checkout lane device.

14. The computer program product of claim 13, wherein the convolutional neural network comprises a convolutional layer, a pooling layer, and a fully-connected layer.

15. The computer program product of claim 13, wherein setting the BOB status using the BOB classification value comprises setting the BOB status to active, indicating a BOB item is located on a lower tray of the cart, when the BOB classification value represents a likelihood the cart is present in the checkout lane with at least one item on the lower tray of the cart.

16. The computer program product of claim 13, wherein setting the BOB status using the BOB classification value comprises setting the BOB status to inactive, indicating a BOB item is not located on a lower tray of the cart, when the BOB classification value represents a likelihood the cart is not present in the checkout lane.

17. The computer program product of claim 13, wherein setting the BOB status for the checkout lane using the BOB classification value further comprises:
   setting the BOB status to inactive, indicating a BOB item is not located on a lower tray of the cart, when the BOB classification value for the image represents a likelihood the cart is not present in the checkout lane; and
   a plurality of consecutive images collected subsequent to the image result in class scores that cross-reference to the same BOB classification value that represents a likelihood the cart is not present in the checkout lane.

18. The computer program product of claim 13, wherein setting the BOB status for the checkout lane using the BOB classification value further comprises setting the BOB status to active, indicating a BOB item is located on a lower tray of the cart, when the BOB classification value for the image represents a likelihood the cart is present in the checkout lane with at least one item on the lower tray of the cart; and a plurality of consecutive images collected subsequent to the image result in class scores that cross-reference to the same BOB classification value that represents a likelihood the cart is present in the checkout lane with at least one item on the lower tray of the cart.

* * * * *